United States Patent
Boal

(10) Patent No.: US 11,814,739 B2
(45) Date of Patent: Nov. 14, 2023

(54) ELECTROLYTIC PRODUCTION OF ORGANIC CHLORAMINE SOLUTIONS

(71) Applicant: De Nora Holdings US, Inc., Concord, OH (US)

(72) Inventor: Andrew Kiskadden Boal, Albuquerque, NM (US)

(73) Assignee: DE NORA HOLDINGS US, INC., Concord, OH (US)

( * ) Notice: Subject to any disclaimer, the term of this patent is extended or adjusted under 35 U.S.C. 154(b) by 357 days.

(21) Appl. No.: 16/307,254

(22) PCT Filed: Jun. 8, 2017

(86) PCT No.: PCT/GB2017/051660
§ 371 (c)(1),
(2) Date: Dec. 5, 2018

(87) PCT Pub. No.: WO2017/212271
PCT Pub. Date: Dec. 14, 2017

(65) Prior Publication Data
US 2019/0345620 A1 Nov. 14, 2019

Related U.S. Application Data

(60) Provisional application No. 62/348,100, filed on Jun. 9, 2016, provisional application No. 62/481,820, filed on Apr. 5, 2017.

(51) Int. Cl.
*C02F 1/68* (2023.01)
*C25B 3/27* (2021.01)
(Continued)

(52) U.S. Cl.
CPC ............... *C25B 3/27* (2021.01); *C02F 1/461* (2013.01); *C02F 1/68* (2013.01); *C02F 2103/22* (2013.01);
(Continued)

(58) Field of Classification Search
CPC .... C25B 3/27; C25B 9/17; C25B 9/75; C25B 11/036; C02F 1/461; C02F 1/68;
(Continued)

(56) References Cited

U.S. PATENT DOCUMENTS 3,449,225 A 6/1969 Matzner
3,776,825 A * 12/1973 Vit ........................... A61K 8/44
205/434

(Continued)

FOREIGN PATENT DOCUMENTS

GB 1037984 8/1966
SU 1721045 A1 3/1992

OTHER PUBLICATIONS

Huber, Johann, "Tolerability of N-Chlorotaurine in the Bovine Mammary Gland", Journal of Dairy Research, 2008, vol. 75, pp. 248-256.
(Continued)

*Primary Examiner* — Stefanie S Wittenberg
(74) *Attorney, Agent, or Firm* — BakerHostetler

(57) ABSTRACT

Disclosed in the present invention are methods for the electrochemical generation of aqueous organic haloamine solutions from precursor solutions comprising at least one halide-containing salt, at least one organic amine component, and an acid additive. The described method allows for the production of aqueous organic haloamine solutions with compositions ranging from a single organic haloamine component to multiple organic haloamine components and multiple free halogen components and solutions with desired pH values.

19 Claims, 3 Drawing Sheets

(51) Int. Cl.
*C02F 1/461* (2023.01)
*C02F 103/22* (2006.01)
*C02F 103/32* (2006.01)

(52) U.S. Cl.
CPC ...... *C02F 2103/32* (2013.01); *C02F 2303/04* (2013.01)

(58) Field of Classification Search
CPC .............. C02F 2103/22; C02F 2103/32; C02F 2303/04; C02F 2103/02; C02F 2103/026; C02F 1/4674
See application file for complete search history.

(56) References Cited

U.S. PATENT DOCUMENTS

| | | | |
|---|---|---|---|
| 3,863,628 A | 2/1975 | Vit | |
| 3,921,297 A | 11/1975 | Vit | |
| 3,932,605 A | 1/1976 | Vit | |
| 5,962,466 A | 10/1999 | Styczynski et al. | |
| 7,846,971 B2 | 12/2010 | Najafi et al. | |
| 7,879,366 B2 | 2/2011 | Mainnemare et al. | |
| 7,893,109 B2 | 2/2011 | Bassiri et al. | |
| 8,709,498 B2 | 4/2014 | Mainnemare et al. | |
| 2004/0116521 A1 | 6/2004 | Gottardi et al. | |
| 2007/0292489 A1 | 12/2007 | Bassiri et al. | |
| 2008/0181815 A1* | 7/2008 | Cheng | C25B 3/27 422/37 |
| 2008/0207750 A1 | 8/2008 | Gottardi et al. | |
| 2008/0269338 A1 | 10/2008 | Gottardi et al. | |
| 2008/0287866 A1 | 11/2008 | Heller | |
| 2009/0029956 A1 | 1/2009 | Pregenzer et al. | |
| 2009/0197838 A1 | 8/2009 | Schneider et al. | |
| 2011/0020474 A1 | 1/2011 | Najafi et al. | |
| 2011/0091570 A1 | 4/2011 | Gottardi | |
| 2011/0151025 A1 | 6/2011 | Gottardi et al. | |
| 2015/0266753 A1* | 9/2015 | Fraim | C02F 1/4674 205/759 |
| 2016/0024667 A1* | 1/2016 | Shanahan | C25B 15/02 205/335 |
| 2016/0068417 A1* | 3/2016 | Buschmann | C02F 1/72 210/663 |

OTHER PUBLICATIONS

Wang, "N-Chloro-2,2-dimethyltaurines: A New Class of Remarkably Stable N-chlorotaurines," Tetrahedron Letters, Mar. 31, 2008, vol. 49, issue 14, pp. 2193-2195.
PCT/GB2017/051660, International Search Report dated Aug. 29, 2017.
PCT/GB2017/051660, Written Opinion dated Aug. 29, 2017.

* cited by examiner

ELECTROLYTIC PRODUCTION OF ORGANIC CHLORAMINE SOLUTIONS

CROSS-REFERENCE TO RELATED APPLICATIONS

This application is the National Stage of International Patent Application No. PCT/GB2017/051660, filed Jun. 8, 2017 which claims priority from U.S. Provisional Patent Application No. 62/348,100, filed Jun. 9, 2016; and U.S. Provisional Patent Application No. 62/481,820, filed Apr. 5, 2017, the disclosures of each of which are incorporated herein by reference in their entireties for any and all purposes.

FIELD OF THE INVENTION

The present invention is related to the use of electrochemistry to produce high concentration aqueous organic haloamine solutions with chemical and anti-microbial properties that allow the organic haloamine solution to be used for water disinfection applications, as topical biocides for biomedical or agricultural purposes, or any other application where an organic haloamine compound applied as an aqueous solution would have utility.

BACKGROUND OF THE INVENTION

Note that the following discussion may refer to a number of publications and references. Discussion of such publications herein is given for more complete background of the scientific principles and is not to be construed as an admission that such publications are prior art for patentability determination purposes.

Organic haloamines are a class of chemical compounds comprising a nitrogen atom bonded to at least one halogen atom and at least one carbon atom. The halogen atom is typically chlorine, with the corresponding organic haloamine compounds being organic chloramines, but the halogen atom can also be bromine or iodine, resulting in either organic bromamine or organic iodoamine compounds. Additionally, mixed halogen compounds are also possible.

Organic haloamines have found numerous uses as topical antibiotics/antiseptic compounds for a wide variety of biomedical applications, including in dentistry, wound disinfection, and the disinfection of biomedical devices. Examples of these applications include U.S. Pat. No. 3,863,628 to Vit entitled "Dental Treatment Method and Apparatus", U.S. Pat. No. 3,921,297 to Vit entitled "Chemically Active Decay Attacking Liquid Administering Apparatus and Fatigue Relieving Connection Therefor", U.S. Pat. No. 3,932,605 to Vit entitled "Dental Treatment", U.S. Pat. No. 5,962,466 to Styczynski entitled "Reduction of Hair Growth Using Inhibitors of Matrix Metalloproteinases", U.S. Patent Application No. 2004/0116521 to Gottardi entitled "Fungicidal Agent Containing N-Chlorotaurine and Use Thereof", U.S. Patent Application No. 2007/0292489 to Bassiri entitled "Method for Treatment of Wound Treatment Using Aganocides", U.S. Patent Application No. 2008/0207750 to Gottardi entitled "Use of N-Chlorotaurine for Treatment of Oozing Tissue Deficiencies", U.S. Patent Application No. 2008/0269338 to Gottardi entitled "Aqueous Solutions Containing Chloramine Which are Free from Di- and Trichloramine, as well as Ammonia", U.S. Patent Application No. 2009/0029956 to Pregenzer entitled "Substance Mixture", U.S. Patent Application No. 2009/0197838 to Schneider entitled "Antimicrobial N-Halogenated Amino Acid Salts", U.S. Pat. No. 7,846,971 to Najafi entitled "N-Halogenated Amino Acids, N,N-Dihalogenated Amino Acids, and Derivatives; Compositions and Methods of Using Them", U.S. Patent Application No. 2011/0020474 to Najafi entitled "Methods of Treating Infections of the Nail or Skin Using Hypohalite", U.S. Pat. No. 7,893,109 to Bassiri entitled "N,N-dihalogenated Amino Acids and Derivatives", U.S. Patent Application 2011/0091570 to Gottardi entitled "Compositions and Devices for Antisepsis and Anticoagulation", U.S. Patent Application No. 2011/0151025 to Gottardi entitled "Compositions Comprising N-Halogenated or N,N-Dihalogenated Amine for Treatment and Prophylaxis of Bronchopulmonary Infections", and U.S. Pat. No. 8,709,498 to Mainnemare entitled "Method of Stimulating Tissue Healing".

Additionally, organic haloamines may also find use as contact topological disinfectants for animals, such as described by "Tolerability of N-Chlorotaurine in the Bovine Mammary Gland" by Huber, published in Journal of Dairy Research, 2008, volume 25 pages 248-256. U.S. Pat. No. 7,893,109 to Bassiri entitled "N,N-dihalogenated Amino Acids and Derivatives" describes haloamines such as those produced through the practice of the present invention as effective surface disinfectant for food contact applications.

Most commonly, the amino acid taurine in it's chloramine state, that is N-chlorotaurine or N,N-dichlorotaurine, is described as the active agent in the above mentioned applications, although other organic haloamines can also be used.

One of the major limitations of the use of organic haloamines for the intended biocidal, antibiotic, and antiseptic applications is that organic haloamines are known to be unstable in aqueous solutions, as described in U.S. Pat. No. 7,879,366 to Mainnemare entitled "Halogenated Composition, Method for Preparing Same and Uses Thereof". This attribute makes organic haloamines unsuitable for long term storage prior to end use in a desired application. N-chlorotaurine, for example, has been shown to be highly susceptible to degradation through hydrolysis with aqueous solutions of N-chlorotaurine and N,N-dichlorotaurine rapidly degrading in a matter of weeks of storage as described by "N-Chloro-2,2-dimethyltaurines: A New Class of Remarkably Stable N-chlorotaurines" by Wang, published in Tetrahedron Letters, 2008, volume 49 pages 2193-2195.

Producing organic haloamines through an on-site generation process would eliminate the concerns surrounding the instability of organic haloamines by producing the desired aqueous organic haloamine solutions as needed, essentially eliminating storage time and loss of organic haloamine potency due to storage. Examples of this approach include U.S. Patent Application No 2008/0287866 to Heller entitled "Methods and Compositions for the Treatment of Pain" which describes the in situ generation of organic chloramines for the treatment of pain and itch, and U.S. Pat. No. 3,776,825 to Vit entitled "Electrolytic Treatment" which describes the electrolytic production of aqueous solutions of organic haloamines from brines made from a combination of a salt containing at least one halide ion, at least one amine compound and a hydroxide compound used in molar excess of the amine compound.

It is the objective of the present invention to teach an improved electrolytic process by which aqueous solutions of organic haloamines, including, but not limited to, N-chlorotaurine and N,N-dichlorotaurine, are produced in an electrolytic process to allow for the use of these solutions in antibiotic, antiseptic, and disinfection applications. It is another objective of the present invention to teach that this process can, surprisingly, occur without the addition of caustic components to the precursor brines while still allowing for the production of organic haloamine solutions.

SUMMARY OF THE INVENTION

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

In a first aspect of the invention there is provided a method for the production of an aqueous organic haloamine solution, the method comprising the steps of:
  (i) preparing an organic amine solution, the organic amine solution comprising an organic amine, at least one halide containing salt, and an acid additive; and
  (ii) electrolyzing the organic amine solution in an electrolytic cell, thereby producing the organic haloamine solution.

It has surprisingly been found that aqueous organic haloamine solutions with a high total halogen concentration may be electrolytically produced without the addition of caustic components to the precursor brines. It has also advantageously been found that the addition of an acid additive prior to electrolysis can also result in the production of organic haloamine solutions with a high total halogen content, and that variation of the amount of the acid additive can enable the production of organic haloamine solutions with a wide range of pH values enabling the solution pH to be adjusted in accordance with the desired application.

The solutions produced by the described methods have particular utility for disinfection. Therefore, in a second aspect of the invention, there is provided a method for the disinfection of a liquid or a substrate, the method comprising the steps of:
  (i) producing an aqueous organic haloamine solution using a method as described herein;
  (ii) contacting the organic haloamine solution with the liquid or the substrate.

The described methods, and the obtained organic haloamine solutions, have particular utility in agriculture, in the food processing industry, and for the topical treatment of wounds or other medical disinfection. The ability to vary the pH of the produced organic haloamine solution according to the desired purpose enhances the utility of the methodology. For example, in the meat processing industry, the produced solutions may be used to treat process water intended to come into contact with animal carcasses, or to treat waste water originating from a meat processing facility. The solutions may also be used to treat water used in agriculture, such as for the irrigation of crops or to treat process water used in the post-harvest processing of fruit or vegetables, for example process water used to wash fruit or vegetables, transport fruit or vegetables in a flume system, cool the fruit or vegetables in a hydrocooling system, or any other post-harvest process wherein disinfection of water is of benefit. The solutions may also beneficially be used to disinfect animals, for example in dairy processing, by contacting the organic haloamine solution with the skin of the animal.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION

Figure 1:
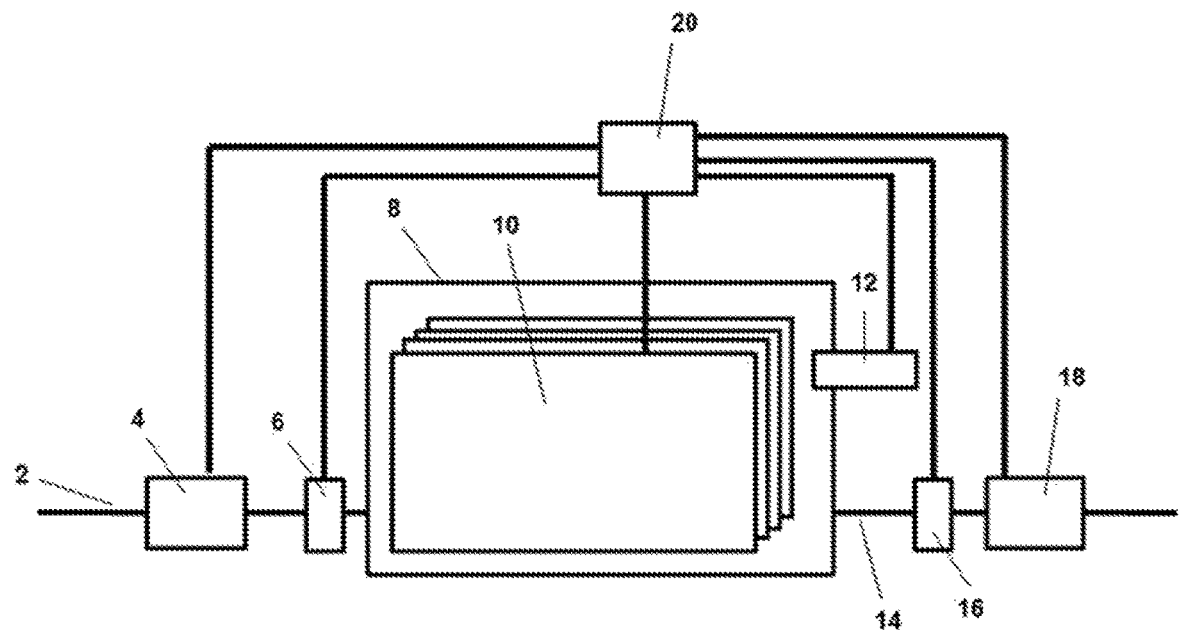
FIG. 1 is a schematic drawing of an electrolysis system for the production of aqueous solutions of organic haloamines through a batch process using a single influent brine stream.

Methods of the present invention comprise of electrochemical processes which produce aqueous solutions containing organic haloamines, mixtures of organic haloamines, organic haloamines combined with free halogens, or mixtures of multiple organic haloamines and free halogens in high concentration. High concentration is defined herein as having a total halogen content as measured by N,N-diethyl-p-phenylenediamine (DPD) analysis of at least 1,000 mg/L (0.1%) or higher.

Organic haloamines are defined herein as being compounds containing at least one nitrogen where the at least one nitrogen has at least one chemical bond with a halogen and the same said at least one nitrogen has at least one bond with carbon. Organic haloamines which preferably comprise the product solutions of the present invention include N-chlorotaurine, N,N-dichlorotaurine, N-bromotaurine, N,N-dibromotaurine, N-iodotaurine, N,N-diiodotaurine, N-bromo-N-chlorotaurine, N-bromo-N-iodotaurine, N-chloro-N-iodotaurine, or mixtures thereof. Other organic chloramines which can comprise the product solution of the present invention can include, but are not limited to, N-chloro-2,2-dimethyltaurine, N,N-dichloro-2,2-dimethyltaurine, N-bromo-2,2-dimethyltaurine, N,N-dibromo-2,2-dimethyltaurine, N-iodo-2,2-dimethyltaurine, N,N-diiodo-2,2-dimethyltaurine, N-bromo-N-chloro-2,2-dimethyltaurine, N-bromo-N-iodo-2,2-dimethyltaurine, N-chloro-N-iodo-2,2-dimethyltaurine, N-chloroglycine, N,N-dichloroglycine, N-bromoglycine, N,N-dibromoglycine, N-iodoglycine, N,N-diiodoglycine, N-bromo-N-chloroglycine, N-bromo-N-iodoglycine, N-chloro-N-iodoglycine, N-chloroalanine, N,N-dichloroalanine, N-bromoalanine, N,N-dibromoalanine, N-iodoalanine, N,N-diiodoalanine, N-bromo-N-chloroalanine, N-bromo-N-iodoalanine, N-chloro-N-iodoalanine, or mixtures thereof. In principle, any organic amine compound, defined as a compound containing at least one nitrogen atom which is bound to at least one hydrogen atom and at least one carbon atom, and which can be dissolved in water could be used in the practice of the present invention to provide an aqueous organic haloamine solution. Preferably, the organic amine is a primary amine. Free halogens which can comprise the product solution produced through the present invention can include hypochlorous acid, hypochlorite ions, hypobromous acid, hypobromite ions, hypoiodous acid, hypoiodite ions, or combinations thereof.

Production of these solutions is achieved through various mechanisms which allow for precise control of both the electrolysis conditions as well as the composition of the brines used in the electrolysis process. Descriptions and examples of the present invention focus on electrolysis processes of brines comprising mixtures of sodium chloride and taurine, both in the presence and absence of added acids. However, it will be obvious to those skilled in the art that other metal halide sources can be used in place of sodium chloride to achieve similar outcomes. Similarly, other organic amines can be used in place of taurine to serve as the precursor of the organic haloamine component of the desired product solution. Other acids beyond the ones used in these examples can also be used in the practice of the present invention. In some applications, such as the treatment of waste water or for water intended for for use in agriculture, it may be preferable to use potassium salts, such as potassium chloride, to avoid increasing the sodium concentration in waste water streams or in irrigation waters.

In U.S. Pat. No. 3,776,825 to Vit entitled "Electrolytic Treatment", Vit discloses that the electrolytic production of aqueous solutions of organic haloamines having a pH in the range of 8 to 12 require the use of a brine made from a combination of a salt containing at least one halide ion, at least one amine compound and, importantly, a hydroxide compound used in molar excess of the amine compound. As taught by Vit, the addition of the hydroxide compound is required for pH control. Brines used by Vit typically have a pH greater than 12, and therefore would generally be considered hazardous to one of ordinary skill in the art. Based on the teachings described in Vit, it would not be obvious to one skilled in the art that similar organic haloamine solutions can be produced electrolytically if the hydroxide component of the precursor brine was not included. Caustic compounds like hydroxide are known by those skilled in the art to increase the pH of a solution, therefore, it would be expected that not including these components in the precursor brine would result in the production of solutions with different properties as a result of electrolyzing said brine.

Precursor brines consisting of a halide containing salt along with an organic amine typically have a pH of 6-7. Upon electrolysis of these neutral to mildly acidic brines, the pH increases resulting in an organic haloamine solution with pH values in the range of 8.10-11.61 as shown in Examples 1-2.

In some applications of organic haloamine solutions, it is preferable that the high concentration organic haloamine solution have a lower pH and, more preferably, that the organic haloamine solution is mildly acidic, for example with a pH less than 5, such as between pH 2 and pH 4.

The present invention can be practiced by the use of a brine solution comprising at least one halide containing compound, at least one organic amine, and an acid additive. The acid additive is typically an inorganic acid, such as a phosphate or a sulfate, for example monosodium phosphate, monopotassium phosphate, or potassium bisulfate, or may be an organic acid, such as citric acid, although any acid compatible with the rest of the process may be used in the formulation of these precursor brines. Preferably, the added acid is potassium bisulfate or monopotassium phosphate.

Upon electrolysis, these acid modified brines can result in organic haloamine solutions with acidic pH values as shown in examples 3-6. Preferably, the organic amine solution prior to the electrolysis has a pH less than 7, for example less than 4.

As shown in Example 5, variation of the amount of the acid additive added prior to electrolysis can be advantageously used to generate organic haloamine solutions with a high total halogen content and with a very wide range of pH values.

The organic haloamine solutions have particular value for disinfection, for example in agricultural applications, in the food processing industry, and for the topical treatment of wounds or other medical disinfection. Once produced the organic haloamine solutions are contacted with the liquid or substrate to be disinfected. It will be understood by the skilled person that the generated solution may be used directly, or the solution may be diluted with water before used according to the requirements of the particular application.

For example, the organic haloamine solutions may be used for water treatment, such as for the treatment of process water at a meat processing facility that is subsequently used for washing animal carcasses, or water that is subsequently used for the disinfection of the skin of live animals, or water that is subsequently used for the irrigation of crops, or process water that is subsequently used for the post-harvest processing of fruit or vegetables, for example process water used to wash fruit or vegetables, or to transport fruit or vegetables in a flume system, or to cool fruits or vegetables in a hydrocooling process.

In such cases the organic haloamine solutions are added to the water upstream of the application of the water. Typically, the required pH to optimize anti-bacterial properties of the organic haloamine solutions is in the range pH 4-7, preferably pH 5-6. The amount of acid added to the organic amine solution can be adjusted so that once the organic haloamine solution is generated, and the organic haloamine solution added to the water, the water has the required pH value. Therefore, the requirement for additional upstream pH adjustment is avoided. Phosphate acid additives may be particularly advantageous for pH control as they act to buffer the water.

The organic haloamine solutions also have utility in the disinfection of waste water, for example waste water originating from a meat processing facility or waste water originating from an agricultural source, such as from irrigation of agricultural crops, or waste water from the post-harvest processing of fruit or vegetables.

In addition, the organic haloamine solutions have utility in the treatment of wounds, or other biomedical disinfection. The solutions generated may be applied directly or further diluted prior to application as appropriate. As described above the amount of acid additive in the organic amine solution may be varied so as to achieve the desired pH in the solution applied to the substrate to be disinfected.

In the practice of the present invention, electrolysis is accomplished using an electrode comprising at least one cathode and at least one anode, although some embodiments of the present invention will also include several intermediate electrode plates to form a bipolar cell. Electrodes can be of any suitable material, but preferably Dimensionally Stable Anodes (which can be used as both the anode and cathode) are used in the present invention. Electrolysis conditions employed in the practice of the present invention are such that they do not result in either the anodic or cathodic destruction of the organic amine component of the brine. The use of an electrolytic cell enables the continuous production of the desired product solutions. The method may also be carried out as a batch process.

In the preferred embodiment of the present invention, shown in FIG. 1, line 2 transfers a brine solution through the action of pump mechanism 4 and past valve 6 into chamber 8. In this embodiment of the present invention, the brine stream comprises a halide containing salt, an acid additive, as well as an organic amine compound at the desired concentration of each species. The halide containing component of this brine is preferably sodium chloride or potassium chloride, but sodium bromide, sodium iodide, potassium chloride, potassium bromide, potassium iodide, other appropriate halide containing compounds, or combinations thereof can be also used as components of the brine. Taurine is the preferred organic amine component of the brine, but glycine, sarcosine, alpha-aminoisobutyric acid, 2-aminoethanol, alanine, beta-alanine, serine, phenyl alanine, norvaline, leucine, isoleucine proline, oligo or poly peptides, organic amine polymers, any other organic amine that is desirable, or combinations thereof can also be used as components of this brine. Monosodium phosphate, monopotassium phosphate, or potassium bisulfate, are preferred acid additives, but other acids may also be used as components of the brine. Once chamber 8 is filled to the desired level, valve 6 is closed to cut off the flow of the brine into chamber 8. At this time, electrode stack 10 is energized to the desired voltage and electrolysis is allowed to continue for the desired amount of time to produce the desired aqueous organic haloamine solution. Physical and chemical properties of the solution being electrolyzed, including, but not limited to, solution level, pH, temperature, free halogen content, total halogen content, conductivity, and oxidation reduction potential are monitored before, during, and after the electrolysis process through sensor package 12. Once the electrolysis process is completed and the desired organic chloramine solution is contained within chamber 8, the aqueous organic chloramine solution is transferred along line 14 once valve 16 has been opened using the action of pump 18. Pumps 4 and 18, valves 6 and 16, electrode stack 10, and sensor package 12 are all preferably connected to control system 20, which monitors and controls all aspects of the electrolysis process and automates the electrolytic conversion of the influent brine into the desired aqueous organic haloamine product solution.

Figure 2:
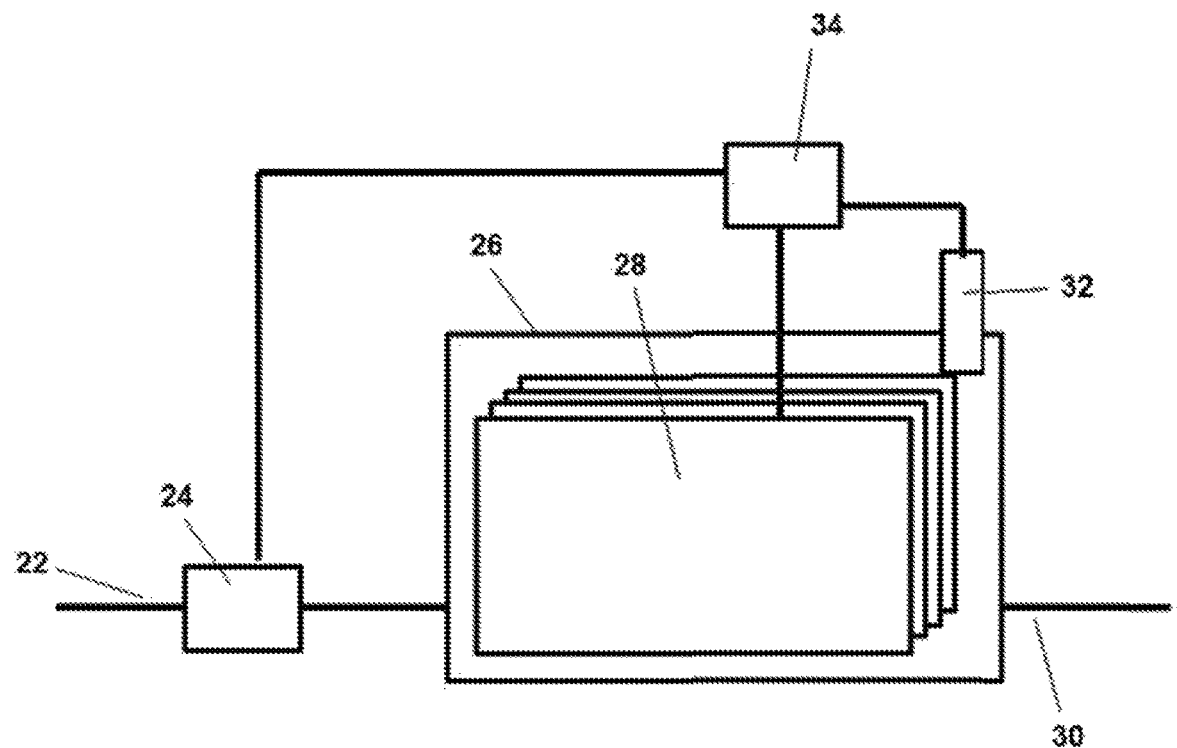
FIG. 2 is a schematic drawing of an electrolysis system for the production of aqueous solutions of organic haloamines using a flow through cell employing a single brine stream.

An alternative embodiment of the present invention is shown in FIG. 2. In this embodiment of the present invention, a brine solution is transported along line 22 through the action of pump 24 into cell compartment 26, where the solution makes contact with electrode stack 28. The brine initially contained in line 22 comprises halide salts, acid additives, and organic amines as described above. Electrode stack 28 is energized to the desired voltage, thus producing the desired aqueous organic haloamine solution, which is then transferred out of cell compartment 26 along line 30. In this embodiment of the present invention, brine solution is constantly being introduced into cell compartment 26 while aqueous organic haloamine solution is constantly flowing out of cell compartment 26. Sensor package 32 is also preferably immersed in the liquid contained within cell compartment 26, and is connected to control system 34. Control system 34 performs a similar function in this embodiment as in the previous embodiment.

Figure 3:
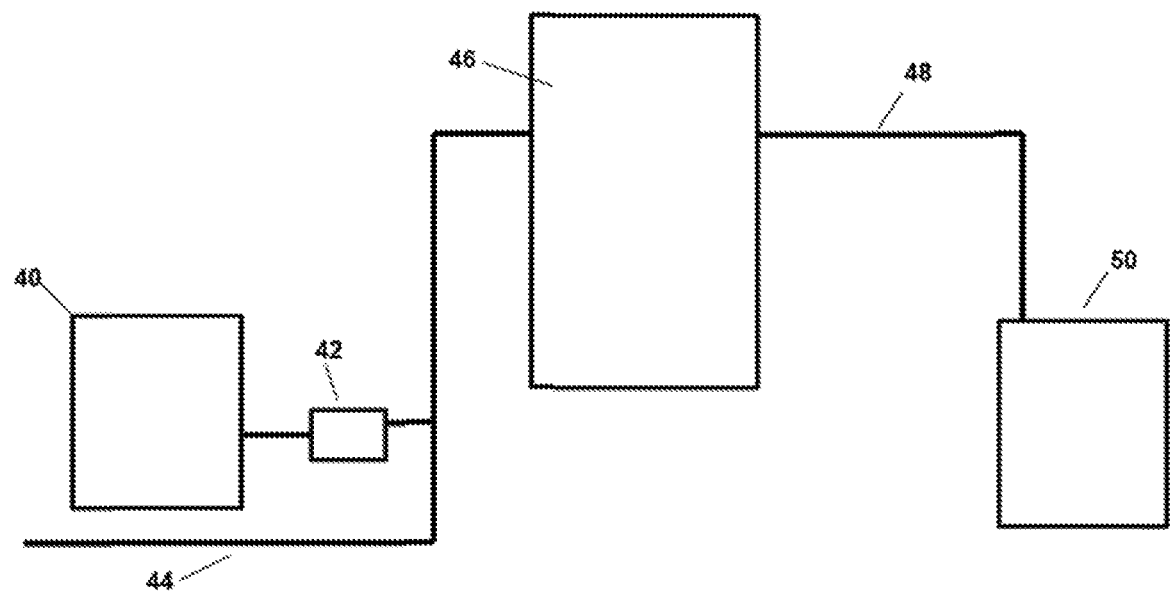
FIG. 3 is a schematic drawing of an electrolysis system for the production of aqueous solutions of organic haloamines using a flow through cell where a single brine source is injected into a water flow.

Another alternative embodiment of the present invention is shown in FIG. 3. In this embodiment of the present invention, tank 40 contains a brine solution which is transferred through the action of pump 42 into line 44, which also contains water. The brine in tank 40 comprises at least one halide salt, an acid additive, and at least one organic amine dissolved in water as in the previous embodiments. Once the brine is combined with the water flow in line 44, the combined solution is then transferred into generation system 46, which contains an electrolytic cell compartment similar to that shown in FIG. 2. Passage of the dilute brine through the electrolytic cell contained within generation system 46 results in the production of the desired aqueous organic haloamine solution, which is then transferred along line 48 and into storage tank 50. The desired aqueous organic haloamine solution is then transferred out of tank 50 using a mechanism not depicted in the drawing to the point of application or use.

Figure 4:
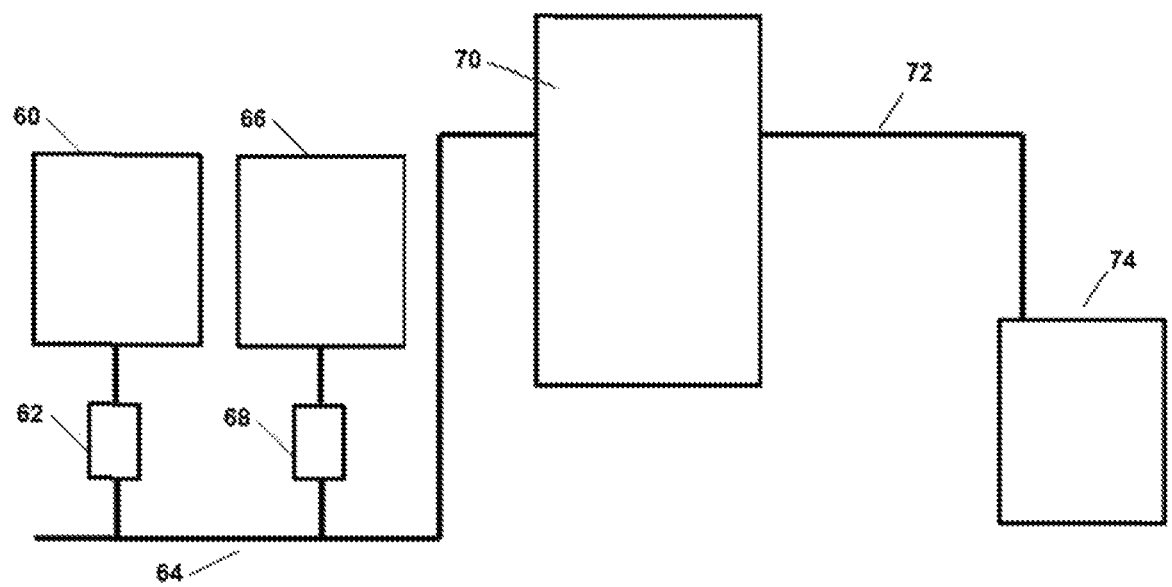
FIG. 4 is a schematic drawing of an electrolysis system for the production of aqueous solutions of organic haloamines using a flow through cell where a dual brine source is injected into a water flow.

A similar alternative embodiment is shown in FIG. 4. In this embodiment of the present invention, tank 60 contains at least one halide salt dissolved in water which is transferred using the action of pump 62 into line 64, which also contains a water flow. Similarly, tank 66 contains an aqueous solution of at least one organic amine and an acid additive, which is transferred through the action of pump 68 also into line 64. The combined flow is then introduced into generation system 70 which contains an electrolytic cell compartment similar to that shown in FIG. 2. Passage of the solution through the electrolytic cell contained within generation system 70 results in the production of the desired aqueous organic haloamine solution, which is then transferred along line 72 and into storage tank 74. The desired aqueous organic haloamine solution is then transferred out of tank 74 using a mechanism not depicted in the drawing to the point of application or use.

In the preceding two embodiments of the present invention, a multitude of sensors, also not shown specifically in the drawing, are preferably used to monitor electrolytic cell activity, physical and chemical properties of the brine, and physical and chemical properties of the produced aqueous organic haloamine solution. Telemetry data from these sensors are utilized by a control system, also not depicted in the figure, to optimize the processes resulting in producing the desired aqueous organic haloamine solution.

Figure 5:
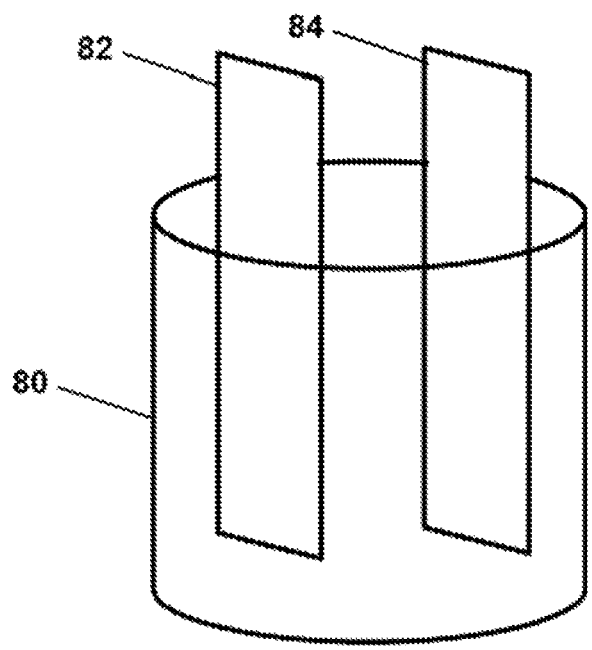
FIG. 5 is a schematic drawing of an electrolysis system for the production of aqueous solutions of organic haloamines using a batch electrolysis process.

Another embodiment of the present invention, depicted in FIG. 5, can be used to produce the desired solution through electrolysis in a batch process. Here, container 80 is first charged with a solution containing at least one organic amine, an acid additive, and at least one halide containing salt. This solution is then electrolyzed when a current is passed between the at least one anode 82 and at least one cathode 84, which are also immersed in the said solution. Electrolysis is controlled via mechanisms not depicted in this drawing. Once electrolysis is deemed completed, the desired solution comprising at least one organic haloamine is removed from vessel 80 via a mechanism not shown in this figure.

Electrolytic cells used in the various embodiments of the present invention can be in any of several common configurations. Preferably, the electrolytic cell is made up of one primary anode, one primary cathode, and any number of desired intermediate electrodes where the fluid in the electrolytic cell compartment is not separated by a membrane or other barrier, thus allowing the product of the anode side of the electrodes (i.e. the anolyte) and the product of the cathode side of the electrodes (i.e. catholyte) to mix freely to form the desired product. Alternatively, in some applications it may be preferable to fabricate an electrolytic cell with one primary anode, one primary cathode, and a semipermeable membrane situated in between the primary anode and primary cathode, thus chemically, but not electrically, isolating the electrode-adjacent solutions from each other.

Use of an electrolytic cell of this nature in the embodiments of the present invention allows for the production of isolated anolyte and catholyte products. Other electrolytic cell configurations can also be utilized in the practice of the present invention.

EXAMPLES

Example 1

An electrochemical system similar to that depicted in FIG. 2 was used to electrolyze brines that were prepared by dissolving taurine and sodium chloride in softened water. In this example, all brines contained sodium chloride at a concentration of 30 g/L and taurine content varied between 2 and 20 g/L. These solutions were then electrolyzed with an applied plate-to-plate voltage of 6V, and samples of the electrolyzed solution collected. Free available chlorine (FAC) content, total chlorine (TC) content, and pH of the electrolyzed solutions were all measured and are presented in Table 1. As can be seen in the results in Table 1, although the brine pH in all cases was between 6 and 7, the pH of the electrolyzed solution was, in all cases, unexpectedly within the range of 8-12 since no hydroxide was incorporated into the precursor brine.

TABLE 1

| Brine Taurine Content (g/L) | Brine pH | Electrolyzed Solution pH | FAC Content in Electrolyzed Solution (mg/L) | TC Content in Electrolyzed Solution (mg/L) |
|---|---|---|---|---|
| 2 | 6.82 | 11.47 | 1500 | 2950 |
| 4 | 6.70 | 11.22 | 50 | 2100 |
| 6 | 6.65 | 10.82 | 0 | 2600 |
| 8 | 6.55 | 9.25 | 0 | 3025 |
| 10 | 6.50 | 8.71 | 0 | 2775 |
| 15 | 6.41 | 8.24 | 0 | 2700 |
| 20 | 6.35 | 8.10 | 0 | 2475 |

Example 2

An electrochemical system similar to that depicted in FIG. 3 was used to electrolyze brines that were prepared by dissolving taurine and sodium chloride in softened water. In this example, all brines were prepared from saturated sodium chloride and had a taurine content of between 10 and 120 g/L. These solutions were then electrolyzed with an applied plate-to-plate voltage of 6V, and samples of the electrolyzed solution collected. FAC content, TC content, and pH of the electrolyzed solutions were all measured and are presented in Table 2. As can be seen in the results in Table 2, although the brine pH in all cases was between 6 and 7, the pH of the electrolyzed solution was, in all cases, within the range of 10-12.

TABLE 2

| Brine Taurine Content (g/L) | Brine pH | Electrolyzed Solution pH | FAC Content in Electrolyzed Solution (mg/L) | TC Content in Electrolyzed Solution (mg/L) |
|---|---|---|---|---|
| 10 | 6.65 | 10.73 | 3075 | 3375 |
| 20 | 6.40 | 11.26 | 2625 | 3325 |
| 40 | 6.22 | 11.61 | 1450 | 2825 |
| 80 | 6.05 | 11.58 | 0 | 2175 |
| 100 | 6.12 | 11.43 | 0 | 2400 |
| 120 | 6.20 | 11.16 | 0 | 2350 |

Example 3

An electrochemical system similar to that depicted in FIG. 3 was used to electrolyze brines that were prepared by dissolving taurine and sodium chloride in softened water. In this example, all brines were prepared from saturated sodium chloride and had a taurine content of 80 g/L. These brines were then further modified through the addition of the desired amount of potassium bisulfate ($KHSO_4$). These solutions were then electrolyzed with an applied plate-to-plate voltage of 6V, and samples of the electrolyzed solution collected. TC content and pH of the electrolyzed solutions were measured and are presented in Table 3. As can be seen in the results in Table 3, without added acid, the pH of the electrolyzed solution is greater than 11 as expected from previous tests. Unexpectedly, the addition of 50 g/L potassium bisulfate to the brine still resulted in an oxidant solution with a pH of 10.67, although 100 g/L potassium bisulfate added to the precursor brine did result in the production of an acidic oxidant solution. It will be obvious to those skilled in the art that it will be possible to produce an oxidant solution with the desired pH by varying the amount of potassium bisulfate and taurine incorporated in the initial brine.

TABLE 3

| Brine $KHSO_4$ Content (g/L) | Electrolyzed Solution pH | TC Content in Electrolyzed Solution (mg/L) |
|---|---|---|
| 0 | 11.04 | 2000 |
| 50 | 10.67 | 2200 |
| 100 | 3.67 | 2000 |

Example 4

An electrochemical system similar to that depicted in FIG. 3 was used to electrolyze brines that were prepared by dissolving taurine and sodium chloride in softened water. In this example, all brines were prepared from saturated sodium chloride and had a taurine content of 80 g/L. These brines were then further modified through the addition of the desired amount of monopotassium phosphate ($KH_2PO_4$). These solutions were then electrolyzed with an applied plate-to-plate voltage of 6V, and samples of the electrolyzed solution collected. TC content and pH of the electrolyzed solutions were all measured and are presented in Table 4. As can be seen in the results in Table 4, the incorporation of monopotassium phosphate into the taurine/sodium chloride brine resulted in the decrease of the pH of the oxidant solution and, as with brines incorporating potassium bisulfate, it is possible to produce an oxidant solution with an acidic pH provided sufficient monopotassium phosphate is added to the initial brine.

TABLE 4

| Brine KH$_2$PO$_4$ Content (g/L) | Electrolyzed Solution pH | TC Content in Electrolyzed Solution (mg/L) |
|---|---|---|
| 0 | 11.04 | 2000 |
| 50 | 9.87 | 2250 |
| 100 | 6.86 | 2300 |

Example 5

An electrochemical system similar to that depicted in FIG. 3 was used to electrolyze saturated aqueous sodium chloride brines that had been modified through the addition of both taurine (concentration of 80 g/L) and potassium bisulfate (KHSO$_4$, 0-150 g/L). Samples of the solutions produced through the electrolysis process were collected and analyzed for pH and TC content.

TABLE 5

| Brine KHSO$_4$ Content (g/L) | Electrolyzed Solution pH | TC Content in Electrolyzed Solution (mg/L) |
|---|---|---|
| 0 | 11.07 | 2075 |
| 10 | 11.16 | 2500 |
| 20 | 11.10 | 2475 |
| 30 | 11.06 | 2575 |
| 40 | 10.99 | 2850 |
| 50 | 10.88 | 2675 |
| 60 | 10.62 | 2625 |
| 70 | 9.97 | 2600 |
| 80 | 9.15 | 2700 |
| 90 | 6.77 | 2500 |
| 100 | 3.10 | 2525 |
| 110 | 2.83 | 2400 |
| 120 | 2.62 | 2300 |
| 130 | 2.33 | 2250 |
| 140 | 2.14 | 2150 |
| 150 | 2.66 | 2650 |

Example 6

An electrochemical system similar to that depicted in FIG. 3 was used to electrolyze saturated aqueous sodium chloride brines that had been modified through the addition of both taurine (concentration of 80 g/L) and potassium dihydrogen phosphate (KH$_2$PO$_4$, 0-150 g/L). Samples of the solutions produced through the electrolysis process were collected and analyzed for pH and TC. Additionally, the pH of the brine was measured prior to use in the electrolysis process.

TABLE 6

| Brine KH$_2$PO$_4$ Content (g/L) | Brine pH | Electrolyzed Solution pH | TC Content in Electrolyzed Solution (mg/L) |
|---|---|---|---|
| 0 | 5.88 | 11.22 | 2275 |
| 10 | 3.40 | 11.17 | 2750 |
| 20 | 3.14 | 11.06 | 2800 |
| 30 | 3.12 | 10.89 | 2925 |
| 40 | 3.00 | 10.81 | 2775 |
| 50 | 2.96 | 10.53 | 2750 |
| 60 | 2.93 | 10.17 | 2775 |
| 70 | 2.91 | 9.48 | 2800 |
| 80 | 2.90 | 8.25 | 2650 |
| 90 | 2.90 | 7.40 | 2575 |
| 100 | 2.88 | 6.95 | 2550 |
| 110 | 2.88 | 6.80 | 2650 |
| 120 | 2.89 | 6.85 | 2575 |
| 130 | 2.89 | 6.67 | 2525 |
| 140 | 2.89 | 6.57 | 2500 |
| 150 | 2.89 | 6.50 | 2425 |

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

The invention claimed is:

1. A method for the production of a disinfectant aqueous organic haloamine solution, comprising:
    electrolyzing an organic amine solution in an electrolytic cell, thereby producing a product consisting essentially of the aqueous organic haloamine solution, wherein the pH of the aqueous organic haloamine solution is less than 7,
    the organic amine solution comprising (i) at least one halide salt, (ii) an organic amine moiety that comprises at least one nitrogen atom that is bound to at least one hydrogen atom and at least one carbon atom, and (iii) an acid moiety, the organic amine moiety and the acid moiety residing on an amino acid selected from the group consisting of taurine, glycine, and alanine, and
    the acid moiety comprising an organic acid, phosphate, or sulfur; and
    applying the product in an undiluted form or in a diluted form to a use location.

2. The method according to claim 1, wherein the aqueous organic haloamine solution comprises an organic chloramine.

3. The method according to claim 2, wherein the at least one halide salt is sodium chloride.

4. The method according to claim 2, wherein the at least one halide salt is potassium chloride.

5. The method according to claim 1, wherein the organic haloamine solution comprises an organic bromamine.

6. The method according to claim 1, wherein the organic haloamine solution comprises an organic chloramine and an organic bromamine.

7. The method according to claim 1, wherein the aqueous organic haloamine solution has a total halogen content of at least 1000 mg/L.

8. The method according to claim 1, wherein the pH of the organic amine solution to before the electrolyzing is less than 10.

9. The method according to claim 1, wherein the pH of the organic amine solution to before the electrolyzing is less than 7.

10. The method according to claim 1, wherein the pH of the organic amine solution to before the electrolyzing is less than 5.

11. The method according to claim 1, wherein the pH of the organic amine solution to before the electrolyzing is between pH 2 and pH 4.

12. The method according to claim 1, wherein the acid moiety is comprised in potassium bisulfate monopotassium phosphate, or monosodium phosphate.

13. The method according to claim 1, wherein the pH of the aqueous organic haloamine solution is less than 4.

14. The method of claim 1, further comprising diluting the product.

15. The method of claim 1, further comprising (i) monitoring one or more of an electrolytic cell activity, a physical or chemical property of the organic amine solution, or a physical or chemical property of the aqueous organic haloamine solution, and (ii) modulating operation of the electrochemical cell in response to the one or more of the electrolytic cell activity, the physical or chemical property of the organic amine solution, or the physical or chemical property of the aqueous organic haloamine solution.

16. The method of claim 2, wherein the aqueous organic haloamine solution has a free available chlorine (FAC) content of from 50 to 3000 mg/L.

17. The method of claim 16, wherein the aqueous organic haloamine solution has a free available chlorine (FAC) content of from 1450 to 2625 mg/L.

18. The method of claim 2, wherein the aqueous organic haloamine solution has a total chlorine (TC) content of from 2000 to 3375 mg/L.

19. The method of claim 18, wherein the aqueous organic haloamine solution has a total chlorine (TC) content of from 2100 to 2850 mg/L.

* * * * *